United States Patent [19]

Wheeler et al.

[11] Patent Number: 4,780,953
[45] Date of Patent: Nov. 1, 1988

[54] METHOD OF ASSEMBLING A SUBMERSIBLE ELECTRIC MOTOR

[75] Inventors: Charles F. Wheeler, Olathe; Darryl M. Nielsen, Lenexa, both of Kans.

[73] Assignee: The Marley-Wylain Company, Mission Woods, Kans.

[21] Appl. No.: 49,020

[22] Filed: Apr. 29, 1987

Related U.S. Application Data

[63] Continuation of Ser. No. 778,129, Sep. 19, 1985, abandoned.

[51] Int. Cl.⁴ .................................... H02K 15/14
[52] U.S. Cl. .................................. 29/596; 29/525; 310/42; 310/87; 310/89; 310/217
[58] Field of Search ............... 29/596, 525; 310/42, 310/87, 89, 217; 417/422

[56] References Cited

U.S. PATENT DOCUMENTS

| 2,741,990 | 4/1956  | White ........................ 310/88 |
| 2,819,415 | 1/1958  | Waterman ................. 384/321 |
| 3,143,676 | 8/1964  | Niemkiewicz ............. 310/86 |
| 3,283,187 | 11/1966 | Schaefer ..................... 310/87 |
| 3,426,690 | 2/1969  | Cattabiani ................. 310/87 |
| 3,457,866 | 7/1969  | Komor ........................ 310/87 |
| 3,508,327 | 4/1970  | Diederichs ................. 310/42 |
| 3,571,921 | 3/1971  | Pieper ........................ 310/42 |
| 3,742,595 | 7/1973  | Lykes ........................ 310/87 |
| 3,761,750 | 9/1973  | Green ........................ 310/87 |
| 3,777,194 | 12/1973 | Schaefer ..................... 310/87 |
| 3,873,861 | 3/1975  | Halm .......................... 310/87 |
| 4,019,836 | 4/1977  | Deters ........................ 417/360 |
| 4,281,973 | 8/1981  | Meneghello ............... 310/87 |
| 4,496,866 | 1/1985  | Yamamoto ................. 310/90 |
| 4,514,652 | 4/1985  | Olson ......................... 310/90 |

FOREIGN PATENT DOCUMENTS

| 701355  | 1/1965 | Canada ....................... 310/87 |
| 1163611 | 2/1964 | Fed. Rep. of Germany ...... 384/321 |

Primary Examiner—P. W. Echols
Attorney, Agent, or Firm—Hovey, Williams, Timmons & Collins

[57] ABSTRACT

An electric motor assembly for a submersible pump has a base and an end ring which together directly, flatly engage opposite ends of a lamination stack so that the stack is thus aligned with the base and the end ring. A shell is pressed over the lamination stack and the ends of the shell are roll-formed to grippingly engage shoulders on the base and the end ring while the stack is held in compression. The shell directly engages the outer cylindrical periphery of the laminations to establish a continuous ground path and also to preclude shifting of individual laminations. The base is molded of a synthetic resinous material and directly supports a sleeve bearing, and a plurality of fluid conduits in the base enable passage of coolant to the bearing during operation of the motor. In preferred forms, the base is provided with an edge for directly engaging one end of a series of pump stagings, and the base also has a shoulder for gripping engagement with a complementarily formed edge of a pump casing.

11 Claims, 3 Drawing Sheets

METHOD OF ASSEMBLING A SUBMERSIBLE ELECTRIC MOTOR

This application is a division of application Ser. No. 778,129 filed 9/19/85, now abandoned.

BACKGROUND OF THE INVENTION

1. Field of the Invention

This invention relates to a roll-formed, submersible electric motor for a well pump wherein motor laminations are compressed between an end ring and a coupling base while an outer metallic shell is formed to grippingly engage the ring and base, thereby maintaining the components in assembled relationship. The coupling base has fluid conduits for circulation of coolant to an armature bearing, and the base also has structure for contacting one end of a stack of pump stages and maintaining the latter in aligned relationship to the pump drive shaft.

2. Description of the Prior Art

Construction of a reliable, efficient submersible electric pump motor has long been a challenge reserved for the most experienced engineers. The motor must be designed to easily fit within the confines of four inch well pipe, yet must develop the required horsepower with high efficiency, low power consumption and long term dependability. The stator must be completely encapsulated to preclude infiltration of water under high pressures encountered in deep wells. Moreover, the various components are desirably resistant to corrosion, impact, and infiltration of water-carried abrasives, the latter of which could lead to bearing failure in a relatively short period of time.

In the past, submersible electric motor stators were commonly assembled by a procedure wherein a series of flat, ring-like laminations is securely interconnected by cleats or straps. The laminations and a plurality of stator windings are inserted between a cylindrical stator liner and an outer motor shell. A top and bottom end ring are resistance welded to the liner and shell, and epoxy is injected in an attempt to fill voids around the laminations and windings.

The upper end of a typical prior art motor has a shouldered cast iron bearing housing received in the bore of the upper end ring, and a pump-motor coupling base is bolted to the upper ring and complementally engages the bearing housing for retaining the latter in general alignment with the motor shell. Also, the base is connected to an end member of a separable pump assembly comprising a plurality of pump stages disposed in stacked relationship between the end member and an upper discharge head.

Unfortunately, such prior art motor assemblies inherently present difficulty in alignment of the armature bearings. Initially, the upper and lower end rings need be maintained in parallel and coaxial alignment during welding of the outer shell and inner stator liner to the rings. Subsequently, the bore of both of the rings must be machined for axial alignment and the end faces of the rings must be machined for parallelism. Furthermore, both of the bearing housings must be machined at their outer, ring engaging peripheries as well as their inner bores. Obviously, this multiplicity of the various machining operations results in an additive buildup of tolerance limits such that each of the machining operations must be precisely kept within a relatively small, specified error list.

Moreover, machining of such motor assemblies is rendered difficult by the size of the outer motor shell in relation to the laminations. Such laminations are of a diameter somewhat smaller than the inner diameter of the shell in order to easily insert the laminations within the shell during assembly. However, during injection of the encapsulating epoxy in the voids surrounding the windings, some of the epoxy might fill a portion of the gap between the outer edge of the laminations and the shell, while in other areas of the motor, little or no epoxy might flow into the gap between the laminations and the shell. As a result, the exterior surface of the motor shell cannot be satisfactorily gripped during machining of the bore and face of the end rings since the partially filled gaps between the laminations and the shell precluded assurance of perfect circularity of the shell and subsequent alignment of the clamping apparatus with the desired bore location of the end rings. Instead, past practice mandated the use of relatively complex, interior clamping mechanisms which expanded to grip a recess within the motor end rings during boring and facing of the latter.

The gap between the edge of the laminations and the shell of prior motors, however small, also required the use of a separate connection for insuring ground continuity between the laminations and the outer shell. Needless to say, there is a long felt need in the art for a pioneering advance in the science of motor construction so that the numerous disadvantages as outlined hereinabove can be avoided.

SUMMARY OF THE INVENTION

The roll-formed motor of the instant invention represents a significant advance in the art not only by presentation of numerous novel components but also by means of unique methods of assembly. In fact, it has been found that the cost of manufacturing the instant motor assembly and its associated pump is reduced to approximately the same expense that would be incurred by replacement of the motor alone in a malfunctioning, prior art pump and motor assembly.

In more detail, a motor end ring and a coupling base are provided which both have a cylindrical projection directly engaging opposite ends of a stack of laminations. The end ring, the base and the laminations are press fit into an outer motor shell which is then roll-formed to grippingly engage complemental shoulders on the ring and base. Also, a stator liner is slidably inserted into recesses in the end ring and base and is provided with O-rings for precluding water infiltration.

The provision of cylindrical projections on the base and the ring for engaging opposite ends of the stack of laminations enables the base and ring to be maintained in axial alignment with the laminations. Once the motor shell is formed to engage the shoulders on the base and the ring, the shell is operable to thereafter retain the projections in engagement with the laminations and consequently thereafter retain both the base and the ring in alignment with the laminations, thereby simplifying the task of aligning the armature bearings to the stator.

The stator liner, which is slidably inserted in a recess in the end ring and a recess or groove in the base, need not be precisely positioned during assembly of the motor. Assembly is thus facilitated in comparison to prior art motors wherein the stator liner must be held in precise coaxial relationship to the end ring and base as the liner is welded to the same.

The stack of laminations is held in compression between the projections of the base and the end ring as the motor is assembled. Thereafter, once the outer shell is formed to complementally engage the ring and base, the shell exerts tensile forces against the base end ring to maintain the laminations in compression. Thus, the need for cleating or straps to retain the laminations in stacked relationship during motor assembly is eliminated.

The outer, cylindrical surface of the lamination stack has a diameter substantially equivalent to the inner diameter of the motor shell. Thus, the shell directly engages each of the laminations to substantially preclude shifting of the laminations in a transverse direction relative to the stack. Advantageously, the laminations are of a diameter such that the latter must be pressed under pressure into the shell during assembly to insure intimate, mating contact with the shell and thus provide a continuous grounding structure for the motor. Furthermore, elimination of the gap between the laminations and shell as found on prior art motors enables the outer shell to be gripped directly by a clamping mechanism for ease of machining the end faces and bores.

The coupling base is an integral assembly which directly connects the motor to the pump. The base is provided with a second shoulder aligned but spaced from the shoulder engaging the motor shell, so that the second shoulder may be utilized for grippingly engaging a complementally formed pump casing and thereby retaining the latter in aligned relationship with the shell. Additionally, the upper end of the coupling base directly contacts the lower stage of the pump staging stack so that the base is thus operable to align the staging relative to the position of the casing.

The base is molded to directly contact and securely support a sleeve bearing for an armature without the use of a bearing housing or the like. Thus, the bearing, in place in its ultimate disposition, can thereafter be machined for exact concentricity and parallelism to the laminations, the shell as well as the bearing housing bore at the opposite end of the motor. The elimination of the upper bearing housing in conjunction with an upper end ring thereby eliminates two machining operations (that is, the machining of the outer housing surface as well as the complemental housing receiving bore in the ring) and consequently positional tolerances of the upper bearing to the lower bearing can be maintained at low limits.

The synthetic resinous coupling base is provided with a plurality of fluid conduits communicating with the outer surface of the armature sleeve bearing for enabling the circulation of coolant to the bearing during use. The large, cast iron bearing housing of prior art motors absorbed thermal energy from its associated bearing and conductively transferred the same toward the end ring and outer shell. However, the fluid conduits in the coupling base of the instant invention enable transfer of heat away from the bearing area without the use of heavy, bulky material heat absorbing structure.

DETAILED DESCRIPTION OF THE DRAWINGS

Figure 8:
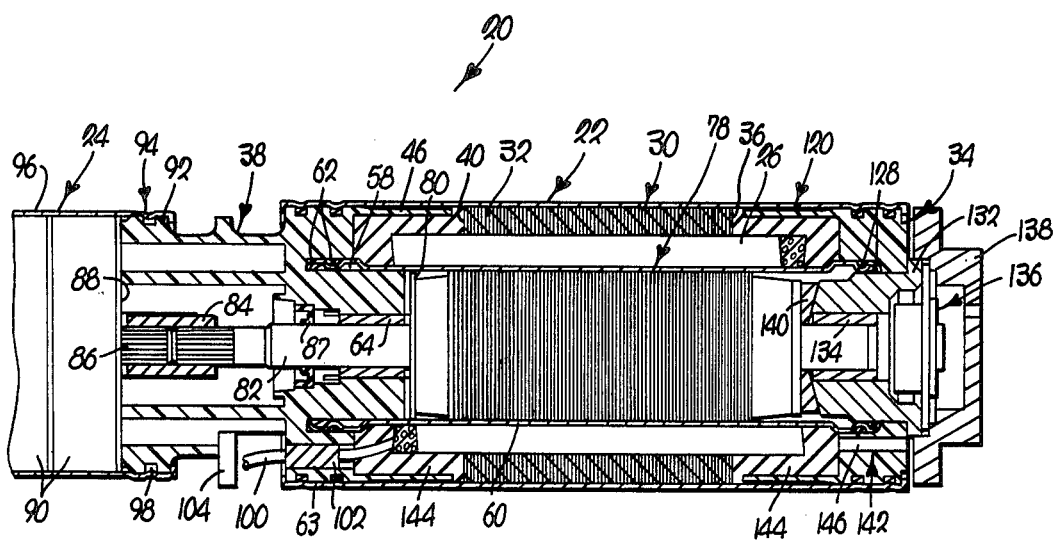
FIG. 8 is an illustration depicting the next step of assembly wherein the end faces, the sleeve bearing and the bearing housing bore are machined for concentricity and parallelism, and thereafter the armature, the lower bearing and bearing housing, and the end plate assembly are installed in the motor, and finally pump staging is brought into engagement with the coupling base and pump casing is formed to complementally engage an upper shoulder on the base.

The assembled submersible pump 20 of this instant invention, as best seen in FIG. 8, includes an electric motor assembly 22 as well as a pump assembly 24. The motor assembly 22, in turn, includes a plurality of windings 26 (see FIGS. 1–2) that are inserted within notches 28 of a stack 30 of a plurality of generally flat, ringlike laminations 32, the stack 30 comprising a field magnet for the motor assembly 22.

Figure 4:
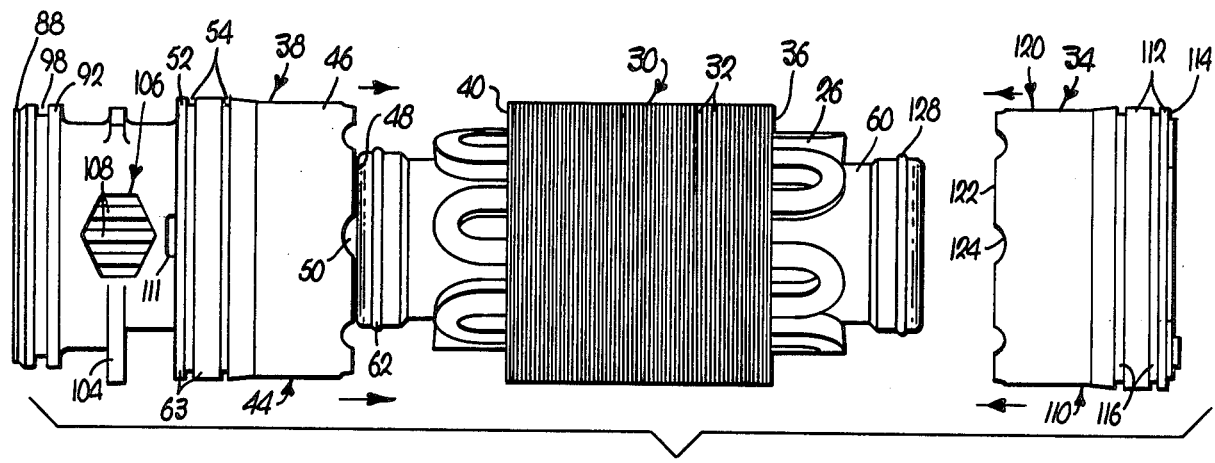
FIG. 4 is a view depicting the next stage of assembly wherein O-rings are mounted internally and externally of the S-shaped portions on the stator liner for engagement with recesses in a coupling base and an end ring.
Figure 5:
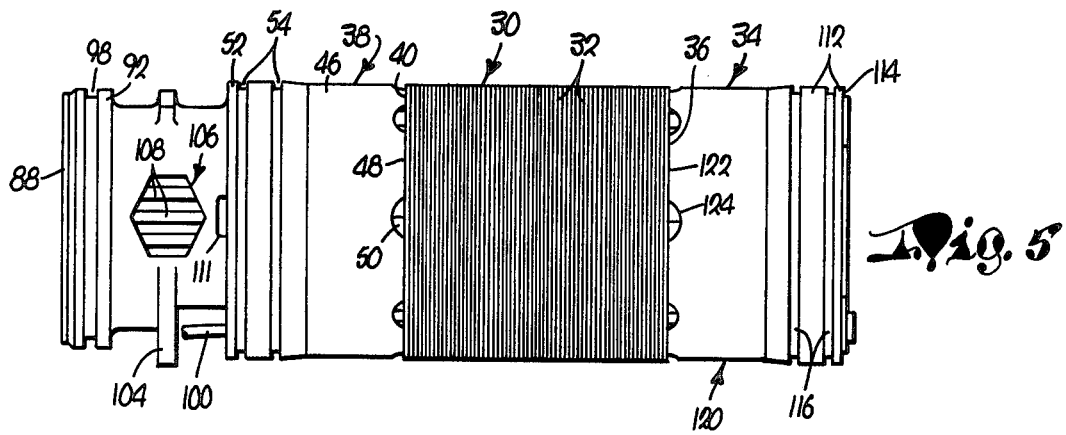
FIG. 5 is an illustration of the next step of manufacture wherein the laminations are held in compression between cylindrical projections on the end ring and the coupling base.
Figure 6:
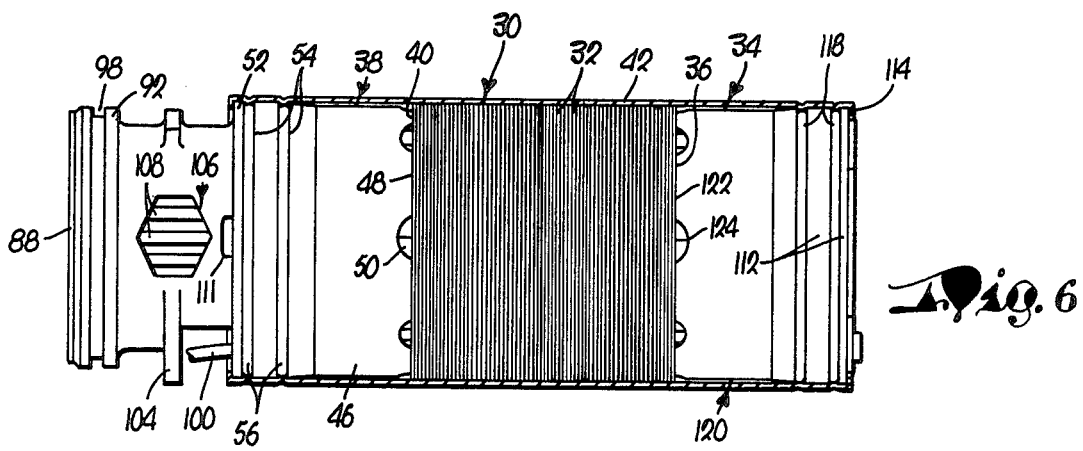
FIG. 6 depicts the next step of assembly of the motor of the instant invention wherein the coupling base, laminations and end ring are pressed into an outer cylindrical shell, and the laminations are held in compression by the end ring and the coupling base while the shell is formed to grippingly engage the base and the ring.

As best seen in FIGS. 4–6, an end ring 34 is disposed adjacent a first end 36 of the stack 30, and a coupling base 38 is disposed adjacent a second end 40 of the stack 30. A tubular, generally cylindrical outer motor shell 43, preferably comprised of stainless steel, surrounds the stack 30 and is secured to the end ring 34 and the base 38. The shell 42 has an inner diameter equivalent to or slightly smaller than the diameter of the cylindrical outer edge of each of the laminations 32, such that the shell 42 directly engages the outer edge of the laminations 32 to substantially preclude shifting of the latter in a transverse direction relative to the stack 30. The shell 42, being electrically conductive, thereby provides a continuous grounding structure for the motor assembly 22.

The base 38 is comprised of a generally cylindrical body portion 44 having structure or a cylindrical projection 46 for contacting the second end 40 of the laminations stack 30. The projection 46 has an outer edge 48 which is provided with recess means or a plurality of scallops 50, for purposes to be explained hereafter. The edge 48, except for scallops 50, flatly engages the outer lamination face of the first stack end 36.

The body portion 44 of the base 38 also has a shoulder 52 that is parallel and coaxial with the edge 48. The shoulder 52 is adapted for engagement with an end portion of the shell 42 and for supporting the latter in generally concentric alignment with the lamination stack 30 as well as the body portion 44. Disposed intermediate the shoulder 52 and the edge 48 are a pair of grooves 54, 54 for supporting a pair of O-rings 56, 56 respectively (see FIGS. 6-8).

Figure 7:
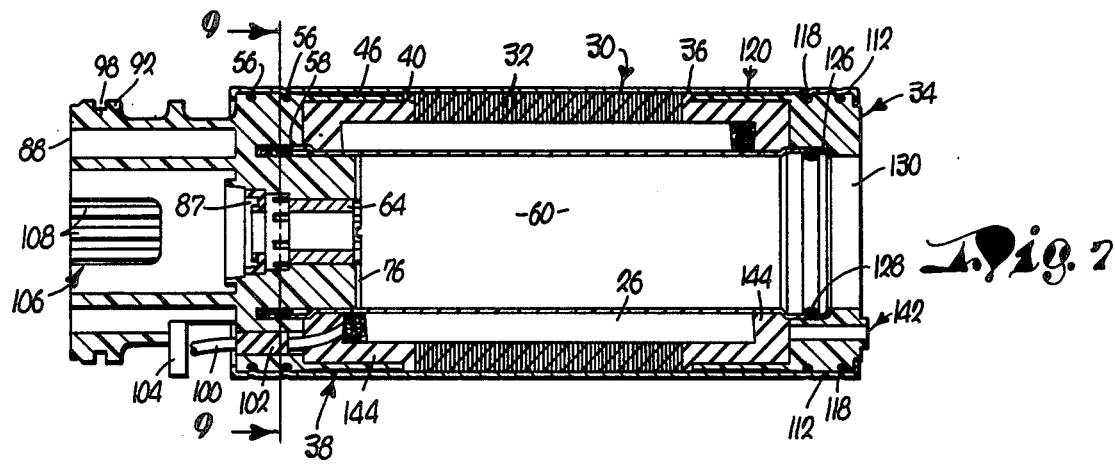
FIG. 7 is a cross-sectional view similar to FIG. 6 wherein interior voids in the vicinity of the laminations and windings are filled with a synthetic resinous adhesive.

The base 38 is also provided with a recess or groove 58 for containing an end portion of a stator liner 60. As illustrated in FIGS. 7-8, the end portion on the left-hand side of the liner 60 is formed into a generally S-shaped configuration, and elastomeric sealing means or a pair of O-rings 62 are located in opposite portions of the S-shaped liner end portion. The cylindrical groove 58 is concentric with the outer corner of the shoulder 52 as well as the grooves 54, the cylindrical projection 46, the edge 48, and a pair of outwardmost cylindrical surfaces 63, 63. Thus, the groove 58 is operable to generally retain the liner 60 in concentric relation with the shell 42 and the base 38.

Figure 9:
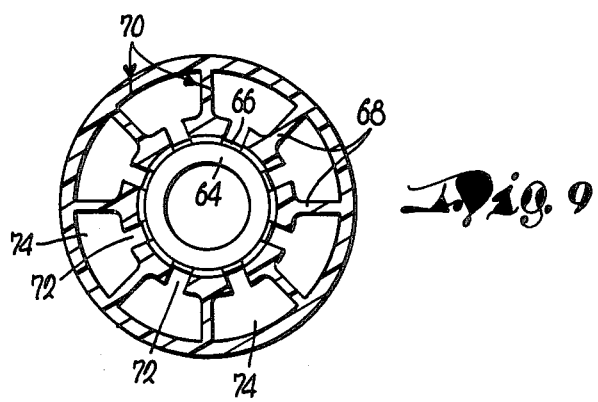
FIG. 9 is an enlarged, sectional view taken along a portion of the line 9—9 in FIG. 7, showing the bearing, the bearing support structure, and the fluid conduits within the support structure for passage of coolant therethrough.

The body portion 44 of the base 38, being comprised of a synthetic resinous material, is molded to grippingly engage a bearing or sleeve bearing 64, the latter of which is provided with serrations (an outer edge of one of which is indicated at 66 in (see FIG. 9) on its outer surface for retaining the bearing 64 in a fixed position relative to the base 38. Thus, since the base 38 is integrally constructed to present both the body portion 44 as well as the lamination contacting structure or projection 46, the body portion 44 maintains the bearing 64 in parallelism with the laminations 32, as well as in alignment with the shell 42 by means of the shoulder 52.

The body portion 44 inwardly of the groove 58 (FIG. 7) is provided with generally T-shaped walls 68 in cross-section (FIG. 9), which transversely are fixedly interconnected to the circumscribing serrations (such as at 66) on the bearing 64. Intermediate the walls 68 are a plurality of fluid conduits 70, each of the which includes a relatively small, elongated passageway 72 communicating with the adjacent, serrated area of the bearing 64 and also a relatively large, elongated channel 74 in side-by-side, fluid communicating relationship to the passageway 72. The fluid conduits 70 thus enable the passage of coolant directly to the bearing and consequently reduce the danger of excessive accumulation of thermal energy in the synthetic resinous body portion 44 surrounding the bearing 64.

Referring now to FIG. 7 in particular, it can be seen that the passageways 72 communicate in an area to the left of the bearing 64 and also to an area to the right of the bearing 64, the latter area also in communication with four radially extending ducts 76. The ducts 76 facilitate circulation of water past the clearance between the stator line 60 and a phenolic washer 80 to an area between an armature 78 and the stator liner 60 (see FIG. 8) which would otherwise be substantially blocked by a phenolic washer 80 disposed between the bearing 64 and the armature 78.

The armature 78 includes a shaft 82 that extends through the bearing 64 and to a coupling 84 which matingly interconnects the armature shaft 82 to a pump stage drive shaft 86. A generally U-shaped wiping seal 87 surrounds the armature shaft 82 within a recess of the base 38 for generally excluding the entry of sand and other contaminants from the pump assembly 24 and into the area adjacent the bearing 64.

The base 38 has an outer edge 88, as illustrated in FIGS. 4-8, which comprises a means for supporting pump staging 90 in substantial, axial alignment with the laminations 32. Moreover, the base 38 has a second shoulder 92 that is disposed remote from the first shoulder 52. The shoulder 92 comprises means adapted for engagement with a complementally formed end portion 94 of a tubular, cylindrical pump casing 96. The shoulder 92 supports the casing 96 in axially aligned relationship with the motor shell 42, the laminations 32, the armature 78 as well as the staging 90. Adjacent the shoulder 92 is a groove 98 to enhance support of the casing 96. Moreover, the shoulder 92 and the edge 88 cooperate to maintain the impeller (not shown) of the staging 90 in concentric alignment with the shafts 82, 86.

The base 38 additionally has a channel for receiving an electrical wire 100 (FIG. 8) and a water resistant connector 102, the wire 100 being coupled to the windings 26 for supplying power thereto. A pair of tabs 104 extend outwardly from the base 38 to releasably secure a wire guard (not shown). Also, the base 38 is provided with a fluid inlet 106 for the pump assembly 24, and the inlet 106 has a plurality of straining bars 108. A slot 111 is disposed adjacent the inlet 106 for the ejection of sand or other abrasive contaminants from the area adjacent the seal 87.

The end ring 34 is somewhat similar in nature to the base 38. That is to say, the end ring 34 has a generally cylindrical body portion 110 with a pair of outwardmost cylindrical surfaces 112, 112. The body 110 also has an outer shoulder 114 comprising a means adapted for supporting one end of the motor shell 42 in surrounding, concentric alignment with the liner 60. A pair of grooves 116, 116 receive elastomeric sealing means or O-rings 118, 118 for sealing engagement of the ring 34 to the shell 42.

The body portion 110 of the ring 34 is provided with a generally cylindrical projection 120 having an outer edge 122 for flatly engaging a lamination face at the first end 36 of the stack 30. Thus, the edge 122 is operable to support the ring 34 in parallel and concentric alignment with the laminations 32 as well as the shell 42 and the liner 60. The edge 122 is provided with a plurality of scallops 124 (see FIGS. 4-6) similar in configuration to the scallops 50 of the edge 48.

The end ring 34 has a recess 126, as best illustrated in FIGS. 7-8, for receiving an expanded, generally S-shaped configured, right-hand end portion of the stator liner 60. The S-shaped portion receives an elastomeric sealing means or a pair of O-rings 128, 128, the outer of which sealingly engages the end ring 34 in the recess 126 for resisting passage of water between the liner 60 and the end ring 34.

The end ring 34 also has a bore 130 for slidably receiving a bearing housing 132, a circumferential portion of which engages the inner O-ring 128. A sleeve bearing 134 is pressed into a central channel through the housing 132 and complementally supports the right hand end of the armature shaft 82, as illustrated in FIG. 8. A pair of axially extending channels (not shown) disposed in the housing 132 adjacent the bearing 134 enables fluid communication between the areas within the liner 60 and a check valve 136, the latter of which permits entry of fluid upon demand.

An end cap 138 mounted over the check valve 136 is bolted to the end ring 34 for retaining the bearing housing 132 securely in the bore 130. Additionally, a thrust washer 140 is conventionally disposed between the bearing housing 132 and an end of the armature 78.

Moreover, the end ring 34 has an elongated passage 142 to enable injection of a quantity of synthetic resinous adhesive or epoxy 144. The epoxy 144 flows into voids around the windings 26 and the laminations 32. A portion of the epoxy 144 also flows into the areas adjacent the scallops 50, 124 such that the epoxy 144, after hardening, preclude relative rotation of the base 38 and the end ring 34 respectively. As the motor assembly 22 is filled with the epoxy 144, a passage in the base 38 (not shown) permits escape of air. Once a sufficient quantity of epoxy 144 is injected, a brass pin 146 is pressed into the passage 142, and a second pin (not shown) is pressed into the passage in the base 38.

Figure 1:
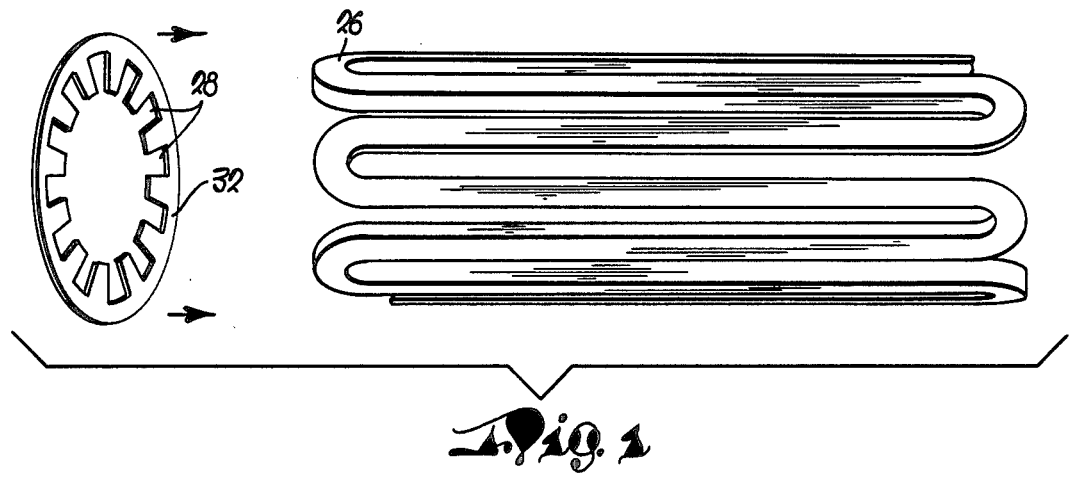
FIG. 1 is a perspective view of a motor lamination and also a fragmentary, side view of a plurality of windings for the motor of the instant invention, as is seen before the laminations are assembled to the windings.
Figure 2:
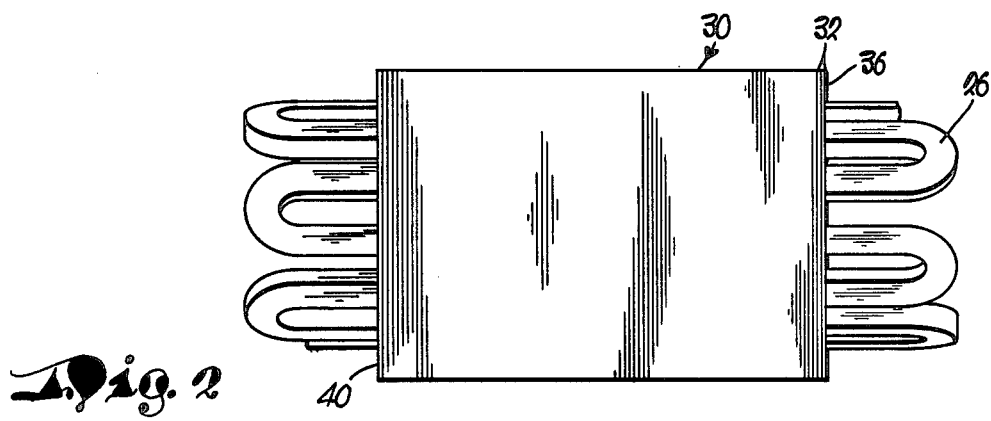
FIG. 2 is a side fragmentary view after assembly of the windings into the laminations.

In the method of assembly of the submersible pump 20, the laminations 32 are slidably installed over the windings 26 so that the latter are disposed within the notches 28, as shown by the arrows in FIG. 1. All of the laminations 32 thus form the stack 30, as shown in FIG. 2.

Figure 3:
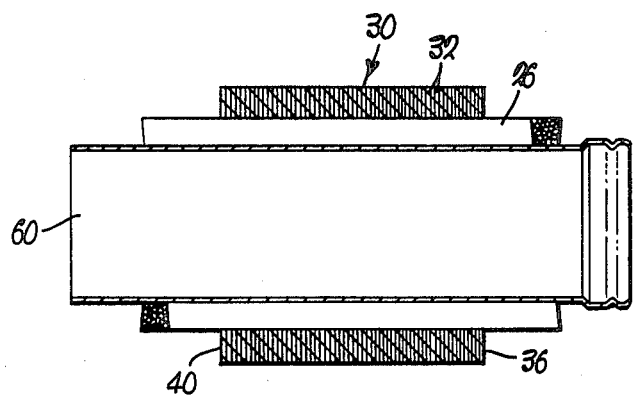
FIG. 3 is a reduced, side cross-sectional view of the next step of assembly wherein a stator liner is inserted within the lamination stack, the liner is expanded radially outward to contact the interior edges of the laminations, and the ends of the liner are thereafter outwardly swaged to form an expanded, S-shaped configuration.

Next, the stator liner 60 is inserted within the core of the stack 30, and as the laminations 32 are compressed together, the liner 60 is expanded in a radially outward direction to bear against the interior edges of the laminations 32, as illustrated in FIG. 3. As shown, a portion of the liner 60 extends outwardly in both directions from the windings 26, and this portion is then swaged to form an expanded cylindrical area, a portion of which has the aforementioned generally S-shaped configuration.

Referring now to FIG. 4, the O-rings 62, 128 are next installed on each end of the liner 60 in opposite portions of the S-shaped liner area. The end ring 34 and the base 38 are then placed into a position adjacent opposite end portions of stack 30 in substantial axial alignment therewith (FIG. 5) such that the edge 122 of the end ring 34 engages a flat face of the first stack end 36, and the edge 48 of the base 38 engages the flat face of the second stack end 40. At the same time, the outwardly extending ends of the liner 60 are slidably shifted toward or inserted within the groove 58 of the base 38 and the recess 126 of the end ring 34, such that the O-rings 128, 62 sealingly engage the end ring 34 and the base 38 respectively.

Next, with reference to FIG. 5, a force is exerted on the base 38 and the end ring 34 such that the laminations 32 are maintained in compressive interengagement. Provision of the edges 48, 122 thus enable the cylindrical base 38 and the end ring 34 to be held in alignment with the stack 30 as the latter is compressed. The O-rings 56, 56, 118, 118 are then installed on the base 38 and end ring 34.

Subsequently, the end ring 34, the base 38 and the stack 30 are pressed under pressure into the tubular shell 42, the latter of which preferably has a diameter slightly smaller than the outwardmost surfaces 63, 63 of the base 38, the surfaces 112, 112 of the end ring 34, and the outer surface of the stack 30 to provide a slight interference fit. Sufficient axial pressure is applied to the end ring 34, the base 38 and the stack 30 to forcibly insert the ring 34, base 38 and stack 30 in the shell 42 and overcome the aforementioned interference fit relationship. The diameter of the base surfaces 63, 63 is substantially equal to the diameter of the surfaces 112, 112, but advantageously they differ very slightly in diameter for ease of forming. In one example, end ring 34 and base 38 are constructed such that the surfaces 63, 63 have a diameter of 3.604 to 3.610 inches, the surfaces 112, 112 have a diameter of 3.597 to 3.603 inches, the outer surface of the lamination stack 30 has a diameter of 3.602 to 3.604 inches, while the shell 42, by comparison, has an inner diameter of 3.589 to 3.597 inches before assembly of the pump 20, and consequently the diameter of the cylindrical surfaces 63, 63 of base 38 are larger than the diameter of the cylindrical surfaces 112, 112 of end ring 34.

While end portions of the base 38 and the end ring 34 respectively are pressed in opposite, axial directions against the stack 30, each end of the shell 42 is then roll-formed to bend around the shoulders 52, 114 as well as tightly engage the O-rings 56, 118. Thereafter, the formed ends of the shell 42 are thus operable to retain the base 38, the end ring 34 and the stack 30 in compressed, assembled relationship.

Next, viewing FIG. 7, a quantity of the epoxy 144 is forced under pressure through the passage 142 to fill voids around the windings 26 and the laminations 32. Subsequently, the pin 146, as well as a second pin for the air escape hole, is pressed into the end ring 34 and the base 38 respectively for sealing engagement therewith.

Then, the motor assembly 22 is gripped around the exterior surface of the shell 42 and the bore of the bearing 64 as well as the bore 130 in the end ring 34 are machined for concentricity and parallelism. At the same time, the left hand edge 88 of the base 38, viewing FIG. 7, as well as the right hand edge of the end ring 34 are faced in true orthogonal relationship to the bearing 64 and the bore 130.

Subsequently, as shown in FIG. 8, the armature 78 is installed such that the shaft 82 extends through the bearing 64 and thereafter the U-shaped seal 87 is installed around the shaft 82. The thrust washer 140 as well as the bearing housing 132 containing the bearing 134 are then installed at the opposite end of the armature shaft 82. The check valve assembly 136 is positioned over the bearing housing 132, and the end cap 138 is then bolted onto the end ring 34 to secure the housing 132 in position.

Next, the coupling 84 is installed over the shaft 82 and the drive shaft 86 along with the staging 90 are brought into position such that the outer end surface of the outwardmost staging 90 flatly engages the edge 88 of the base 38. The pump casing 96 is then formed to grippingly engage the shoulder 92.

As should now be obvious to those skilled in the art, the provision of the lamination engaging structure or edges 48, 122 of the base 38 and the end ring 34 respectively enables the stack 30 to easily be maintained in alignment with the base 38 and the end ring 34 so that the bearings, 64, 134 are also maintained in alignment with the lamination stack 30. Thus, manufacture of the motor assembly 22 is simplified over prior art motors having end rings welded to the stator liner and an outer shell, since such rings must be held in alignment during welding and the position of the lamination stack within the liner and an outer shell, since such rings must be held in alignment during welding and the position of the lamination stack within the liner and the shell cannot be precisely controlled.

Moreover, direct compression of the laminations 32 in the instant invention between the base 38 and the end ring 34 eliminates the necessity for utilization of cleating or straps to hold the laminations 32 together during assembly. Elimination of such cleating reduces costs and also eliminates an extra step during assembly.

Moreover, by utilization of a press fit between the shell 42 and the laminations 32, the shell 42 is thus operable to substantially preclude shifting of the laminations 32 in a transverse direction relative to the stack 30. By comparison, prior art motors were generally dependent on either the cleating or the epoxy adjacent the laminations in an attempt to preclude shifting of the latter.

Machining of the motor assembly 22 for precise orientation of the armature 78 of the instant invention is also simplified in comparison to prior practice. By provision of a base 38 directly securing the bearing 64, the use of a bearing housing supported by the base 38 is rendered unnecessary, thereby reducing the buildup of tolerance limits of the assembly accordingly. At the same time, as the edge 88 is faced, the edge 88 can be brought into true perpendicular relationship to the bore of the bearing 64 so that the staging 90, as well as the casing 96, are in alignment with the bore of the bearing 64.

Because the base 38 and the end ring 34 are comprised of an electrically insulative synthetic resinous material, the windings 26 can engage the base 28 and the end ring 34 in pressing contact therewith without fear of damaging the insulation on the windings 26 and thereby creating a ground fault path. Thus, during assembly, the ends of the windings 26 of the instant invention can be significantly compressed such that the overall length of the motor assembly 22 is reduced. By comparison, certain prior art motors used teflon tape or other extra, insulative material at the end of the winding loops and adjacent the metallic end structures in an effort to reduce the possibility of such ground faults.

We claim:

1. A method of assembling an electric motor comprising the steps of:
    providing a generally cylindrical, tubular shell having an inner diameter of a certain value;
    placing a base and an end member adjacent opposite end portions of a lamination stack in substantial axial alignment therewith,
    each of said base, said end member and said lamination stack presenting a generally cylindrical surface of a diameter larger than said certain value before assembly of said motor;
    applying sufficient axial pressure to said base, said lamination stock and said end member to forcibly insert under pressure said base, said stack and said end member in said shell,
    said axial pressure being sufficient to overcome the interference fit relationship presented between said tubular shell and said base, said stack and said end member; and
    roll-forming end portions of said shell to grippingly engage shoulder portions of said base and said end member to thereafter retain said base, said stack and said end member in assembled relationship.

2. The method as set forth in claim 1; including the step of pressing in opposite, axial directions said end portions of said lamination stack by said base and said end member respectively during said step of roll-forming said end portions of said shell.

3. The method as set forth in claim 1, wherein said step of placing a base and an end member adjacent opposite end portions of a lamination stack includes the step of contacting said end portions of said stack with generally cylindrical projections of said base and said end member respectively for covering and for thereby protecting windings received in said lamination stack.

4. The method as set forth in claim 3; including the step of pressing in opposite, axial directions said end portions of said lamination stack by said cylindrical projections of said base and said end member respectively during said step of roll-forming said end portions of said shell, for aligning said base and said end member to said lamination stack.

5. The method as set forth in claim 1; including the step of constructing said generally cylindrical surface of one of said end member and said base with a larger diameter than said diameter of said generally cylindrical surface of the other of said end member and said base for ease of roll-forming said shell to said base and said end member.

6. The method as set forth in claim 5; including the step of forming said generally cylindrical surface of said lamination stack with a diameter which is of a value in a range between said diameter of said generally cylindrical surface of said end member and said diameter of said generally cylindrical surface of said base.

7. The method as set forth in claim 1; including the steps of:
    inserting a generally cylindrical stator liner in a core of said lamination stack; and
    expanding said liner in radially outwardly directions to bear against interior edges of said lamination stack.

8. The method as set forth in claim 7, wherein said step of placing a base and an end member adjacent opposite end portions of a lamination stack includes the step of shifting opposite end portions of said stator liner toward a position within recess means formed in said base and said end member respectively.

9. The method as set forth in claim 1; including the step of substantially filling a space in the vicinity of said lamination stack with an initially flowable synthetic resinous adhesive subsequent to said step of roll-forming said end portions of said shell.

10. The method as set forth in claim 9, wherein said base and said end member each include generally cylindrical projections in contact with opposite end portions of said lamination stack; and including the step of forming recess means on said projections recess means for receiving a portion of said adhesive and for generally precluding relative rotation of said base and said end member after hardening of said adhesive.

11. The method as set forth in claim 1, wherein said step of placing said base and said end member adjacent opposite end portions of said lamination stack occurs prior to said step of applying sufficient axial pressure to said base, said lamination stack and said end member to forcibly insert under pressure said base, said stack and said end member in said shell.

* * * * *